United States Patent [19]

Markl et al.

[11] Patent Number: 4,844,842

[45] Date of Patent: Jul. 4, 1989

[54] AIR HUMIDIFIER FOR DRY TREATMENT DEVICE FOR PHOTOGRAPHIC MATERIAL

[75] Inventors: Maximilian Markl, Prien; Günter Heidrich, Munich; Manfred Schmidt, Kirchheim; Jürgen Müller, Munich; Dieter Wauer, Taufkirchen, all of Fed. Rep. of Germany

[73] Assignee: AGFA Gevaert AG, Leverkusen, Fed. Rep. of Germany

[21] Appl. No.: 277,842

[22] Filed: Nov. 30, 1988

[30] Foreign Application Priority Data

Dec. 19, 1987 [DE] Fed. Rep. of Germany ....... 3743185

[51] Int. Cl.[4] ............ B01F 3/04

[52] U.S. Cl. ............ 261/30; 261/90; 261/92; 354/300

[58] Field of Search ............ 261/30, 90, 92, 84; 354/300, 312

[56] References Cited

U.S. PATENT DOCUMENTS

| | | | |
|---|---|---|---|
| 2,427,714 | 9/1947 | Cooper | 261/90 |
| 2,631,831 | 3/1953 | Robic | 261/92 |
| 3,285,586 | 11/1966 | Powers | 261/92 |
| 3,727,533 | 4/1973 | Perl | 354/312 |
| 3,730,497 | 5/1973 | Schmitt et al. | 261/92 |
| 4,135,803 | 1/1979 | Houwelingen | 354/300 |
| 4,200,496 | 4/1980 | Stein | 354/300 |
| 4,241,989 | 12/1980 | Jackson et al. | 354/300 |
| 4,731,224 | 3/1988 | Kawashima | 261/92 |

*Primary Examiner*—Tim Miles

*Attorney, Agent, or Firm*—Michael J. Striker

[57] ABSTRACT

An air humidifier for moisturizing air in a dry treatment device for a photographic material comprises a housing having inner walls and provided with at least one air aspiration openng and at least one air discharge opening, a moisturizable element arranged in the housing, a unit for blowing air through the moisturizable element and then through the air discharge opening to a space to be moisturized and also located in the housing, the moisturizing element being formed as a rotatable disc arranged before the air discharged opening and provided with rotary drive unit for its rotation, a light protective plate arranged between the moisturizable disc and the unit for blowing air and at least locally spaced from the inner wall of the housing so as to form throughgoing air passages, and light separating parts provided behind the throughgoing air passages and before the moisturizable disc.

21 Claims, 4 Drawing Sheets

24
18
13
5
15
19
13
16
23
14
13

22
20
21
23
22
11a
8
4
21
10
23
2
11a
17
10
30
7
11
12
1
9
3
26

29
18
3
5
25
28
1
26

AIR HUMIDIFIER FOR DRY TREATMENT DEVICE FOR PHOTOGRAPHIC MATERIAL

BACKGROUND OF THE INVENTION

The present invention relates to an air humidifier for moisturizing the air in a dry treatment device for photographic material, such as X-ray film cassette loading and unloading devices or image screen receiving devices for automatic film supply in a film platform.

Air humidifiers of the above mentioned general type include a housing with at least one air aspirating opening and at least one air discharge opening, a moisturizable foam material plate, and a ventilator which blows air through the foam material plate and then through the air discharge opening to a space to be moisturized.

The known air humidifiers of the above mentioned general type operate in accordance with a "evaporation principle". An axial fan produces an air stream which passes through a moisturized foam material plate arranged perpendicularly to the stream. The air which is blown through the foam material plate takes water from it because of the diffusion gradient, so that the moisture is blown into the space to be moisturized. In this operation a drop formation or the formation of condensation water is precluded.

This moisturizing principle is suitable for the inner moisturizing of devices for dry treatment of photographic materials. In these devices, such as for example X-ray film cassette loading and unloading devices, air to be dried leads to electrostatic charging of the photographic material which during the discharge leads to so-called accidental exposure of the film. This electrostatic charging can be avoided only by an air humidifier. The above described known device has the disadvantage that the fixedly arranged foam material plate has dimensions of approximately 15 cm×35–40 cm×1 cm for producing the above described action. Thereby the dimensions of the known air humidifiers are high, so that its mounting in or arrangement on the X-ray cassette loading and unloading devices or image screen receiving devices with an automatic loading and unloading of the film platform with a sheet film of required formats, encounters considerable difficulties. In addition, an absolute light-tight connection of the big humidifier with the inner space of the dry treatment device is required.

SUMMARY OF THE INVENTION

Accordingly, it is an object of the present invention to provide an air humidifier of the above mentioned general type, which avoids the disadvantages of the prior art.

More particularly, it is an object of the present invention to provide an air humidifier of this type which is highly effective and at the same time has a smaller size, and which is formed so that it is especially easy to place it on or insert it in a dry treatment device for photographic material and to connect it with the latter in a light-tight manner.

In keeping with these objects and with others which will become apparent hereinafter, one feature of the present invention resides, briefly stated, in that the foam material plate is formed as a rotatable foam material disc which is arranged immediately before an air discharge opening, between the foam material disc and its motor or the motors for the foam material disc and/or the ventilator for blowing air a light protective plate is arranged with at least local distances from inner walls of the housing, and light separating parts are provided at a distance behind the air throughgoing openings formed by the above specified distances.

The use of rotatable foam material disc on which either the water drops or falls, or which is immersed in a bath provided with water having a predetermined level, a uniform liquid distribution in the foam material is achieved. Thereby the air which flows through the foam material disc is moisturized in a uniform and efficient manner. The foam material disc has a diameter of approximately 10 cm and a thickness of approximately 2 cm for obtaining the desired action, so that the air humidifier has corresponding small size.

In accordance with another advantageous feature of the present invention, the light separating parts are formed by labyrinth ribs and grooves, and walls of a foam material disc support engage with the ribs and grooves.

Still another feature of the present invention is that a removable cover is connectable with the housing and provided with at least one opening which is closeable by a cover plate in a light-tight manner.

The air aspiration opening can be formed between a rear wall which is spaced from the housing by spacer pins provided with heads which are engageable in grooves of the housing.

The bath in which the foam material disc is immersed can communicate with an additional water supply container which is supplied with water from a bottle introduced into the supply container similarly to chicken drinking devices.

Finally, the discharge opening of the housing can be connected in a light-tight manner with a housing opening of the dry treatment device or an opening in the intermediate wall between the dry treatment device and wet treatment device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
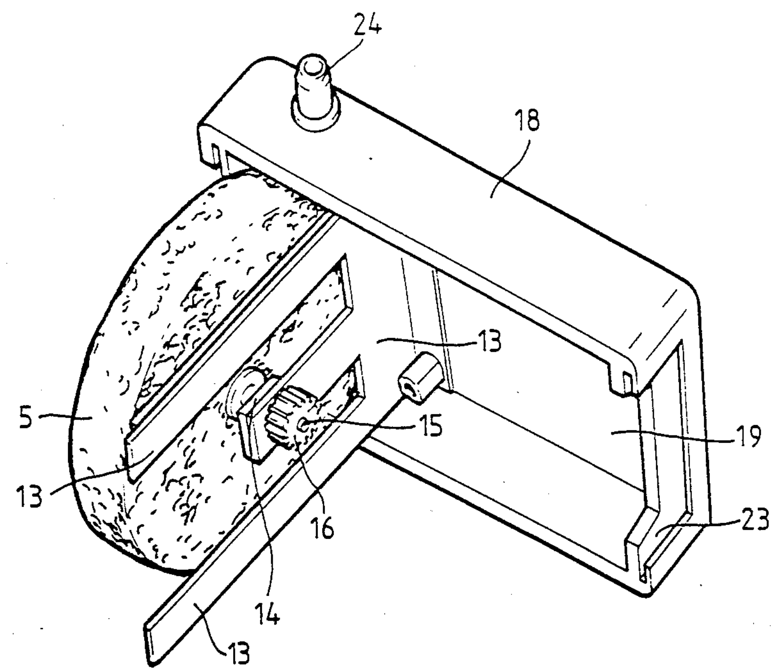
FIG. 1 is a perspective partially broken view showing an air humidifier in accordance with the present invention.
Figure 1:
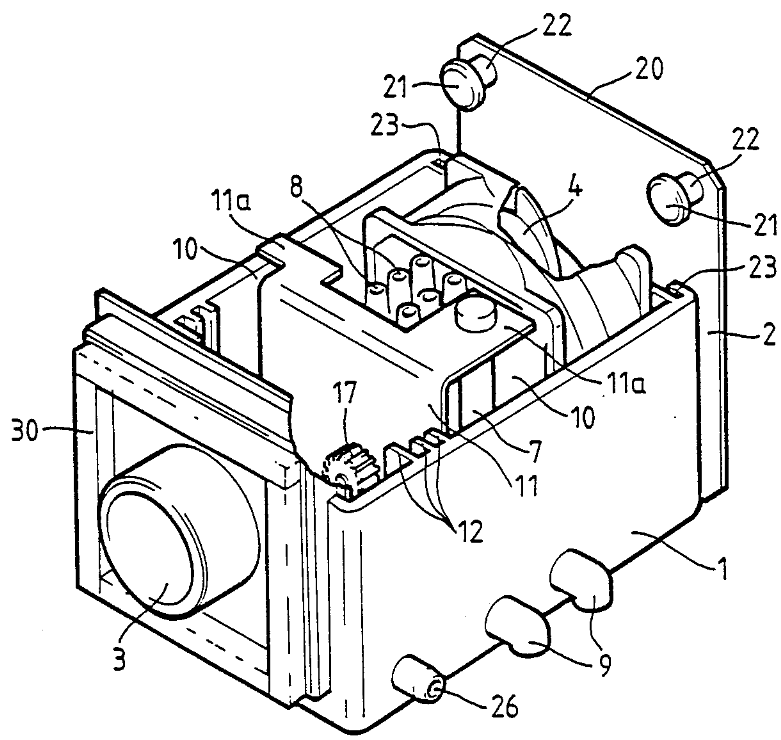

An air humidifier shown in FIGS. 1–4 has a housing 1 with at least one air aspirating opening 2 and a discharging opening 3. Outer air is aspirated through the opening 2 by means of a ventilator 4 formed for example as an axial fan. Then it is blown through a foam material 5 which is moisturized with water. The air takes the moisture from the foam material 5, and the moist air is blown through the opening 3 into a chamber 6 to be moisturized.

The plate 5 of foam material is formed as a foam material disc which is driven by a motor. The foam material disc is arranged immediately behind the air discharge opening 3. A light protective plate 11 is arranged between the foam material plate 5 on the one hand and the motor 7 or the motor and a further motor for the ventilator 4 and electrical supply conduits 8 and 9 arranged in a moisture protective manner on the other hand. The light protective plate 11 is supported via projecting tongues 11a on the housing 1 or on parts 7 supported in the housing. The light protective plate 11 has at least local distances 10 from inner walls of the housing 11. For preventing light penetration from behind through the air aspiration opening 2 and light throughgoing openings formed by the distances 10 into the inner chamber 6 which is closed in a light-tight manner, light separating parts 12 and 13 are arranged at a distance from or behind the light throughgoing openings which are formed by the distances 10 prior to the disc 5 of foam material as considered in direction of the air stream. The light separating parts 12 and 13 can be formed by labyrinth ribs or grooves 12 in the housing 1. On the other hand that can be formed by wall parts 13 of a support 13 for the disc 5.

For providing easy exchange of the foam material disc 5, the wall parts 13 are insertable from above into the labyrinth grooves. A toothed gear 16 is supported on a drive shaft for the foam material disc 5. The toothed gear 16 during insertion of the wall parts 13 into the labyrinth grooves is brought in engagement with a motor pinion 17 which extends through the light protective disc 11.

The housing 1 has a cover 18 which is connectable with the housing in a light-tight manner. The upper side of the housing can be provided with two openings which are not shown. The openings are closeable by only partially shown plates 19 in a light-tight manner. One of the plates 19 is mounted with screws and covers the motor chamber and the ventilator 4, so that they can be accessible when needed. The second not shown plate supports the wall part 13, so that upon removal of this plate the foam material disc 5 can be removed from the housing 1, for example for exchange. The cover 18 as a whole can be mounted on the housing 1 by a not shown groove-rib connection and fixed on it.

As can be seen from FIG. 1, the air aspirating openings 2 are provided between a rear wall 20 which is spaced from the housing 1 and is opposite to the air discharge opening 3, on the one hand, and the housing 1, on the other hand. For this purpose, the rear wall 20 is provided with heads 21 of spacer pins 20 which extend toward the ventilator 4 and are insertable in grooves 23 of the rear side of the housing and the cover 18.

Figure 2:
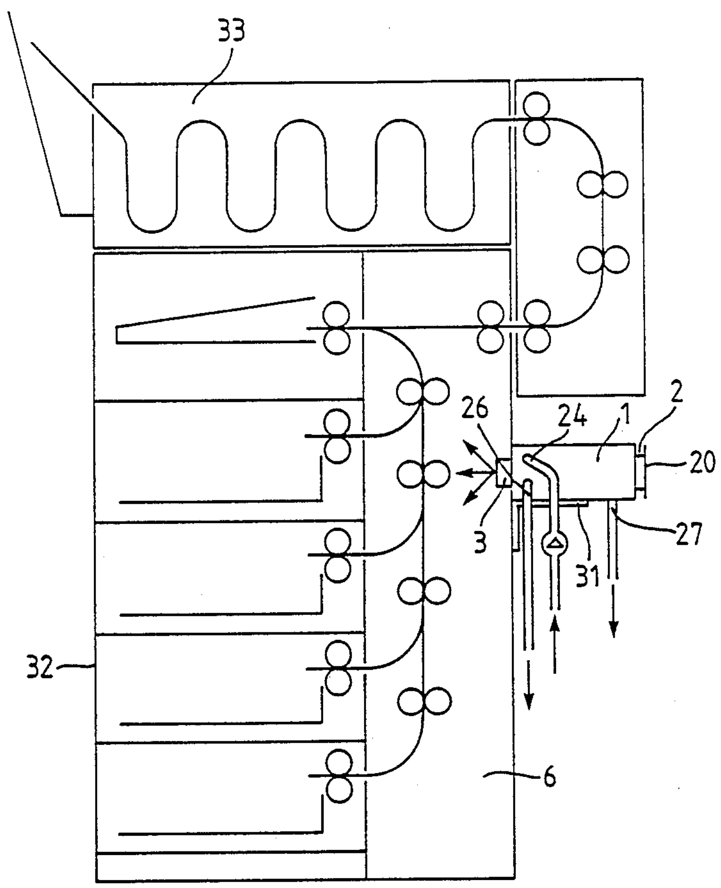
FIG. 2 is view showing the inventive air humidifier arranged on a dry treatment device for a film.

In the embodiment of FIGS. 1 and 2, tap water is supplied for air moisturizing above the foam material disc 5 through a supply opening 24 provided in the housing or the cover. Thereby the foam material disc 5 is moisturized from above. A bath 25 shown in FIG. 2 is provided under the foam material disc 5 and/or the motors and/or the ventilator 4. It is arranged for collecting water dripping from the foam material disc 5. As shown in FIG. 1, a flow discharge opening 26 is provided in the bath 25, so that the water which is not taken by the air stream can be discharged into a discharge conduit or supply container for further recirculation. An emergency discharge valve 27 can be provided for the case when water in the bath raises too high.

Figure 3:
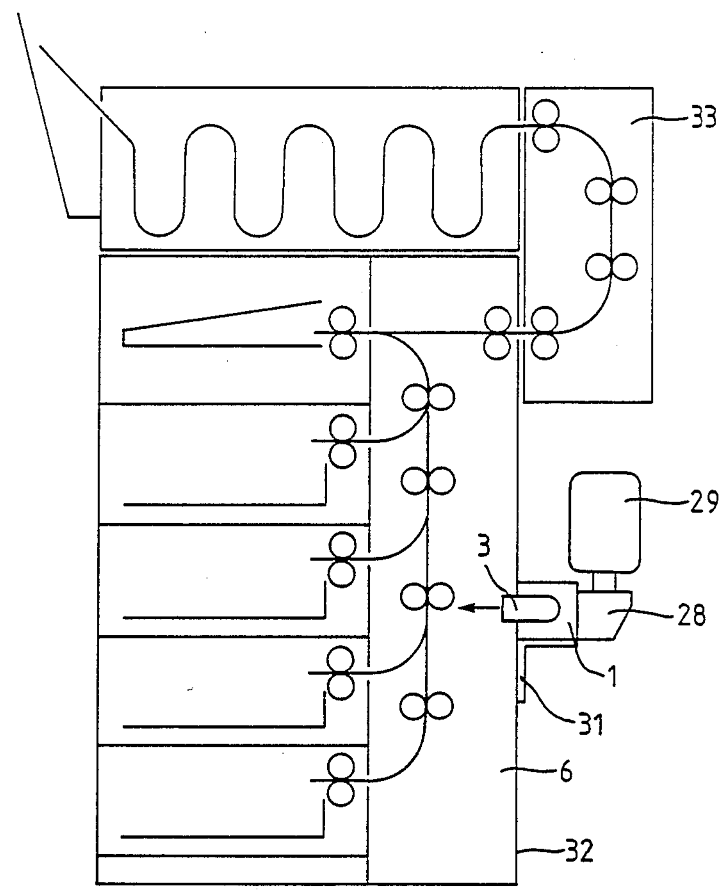
FIG. 3 is a view showing the inventive air humidifier arranged on a dry treatment device and provided with a water supply bottle in accordance with another embodiment of the present invention.
Figure 4:
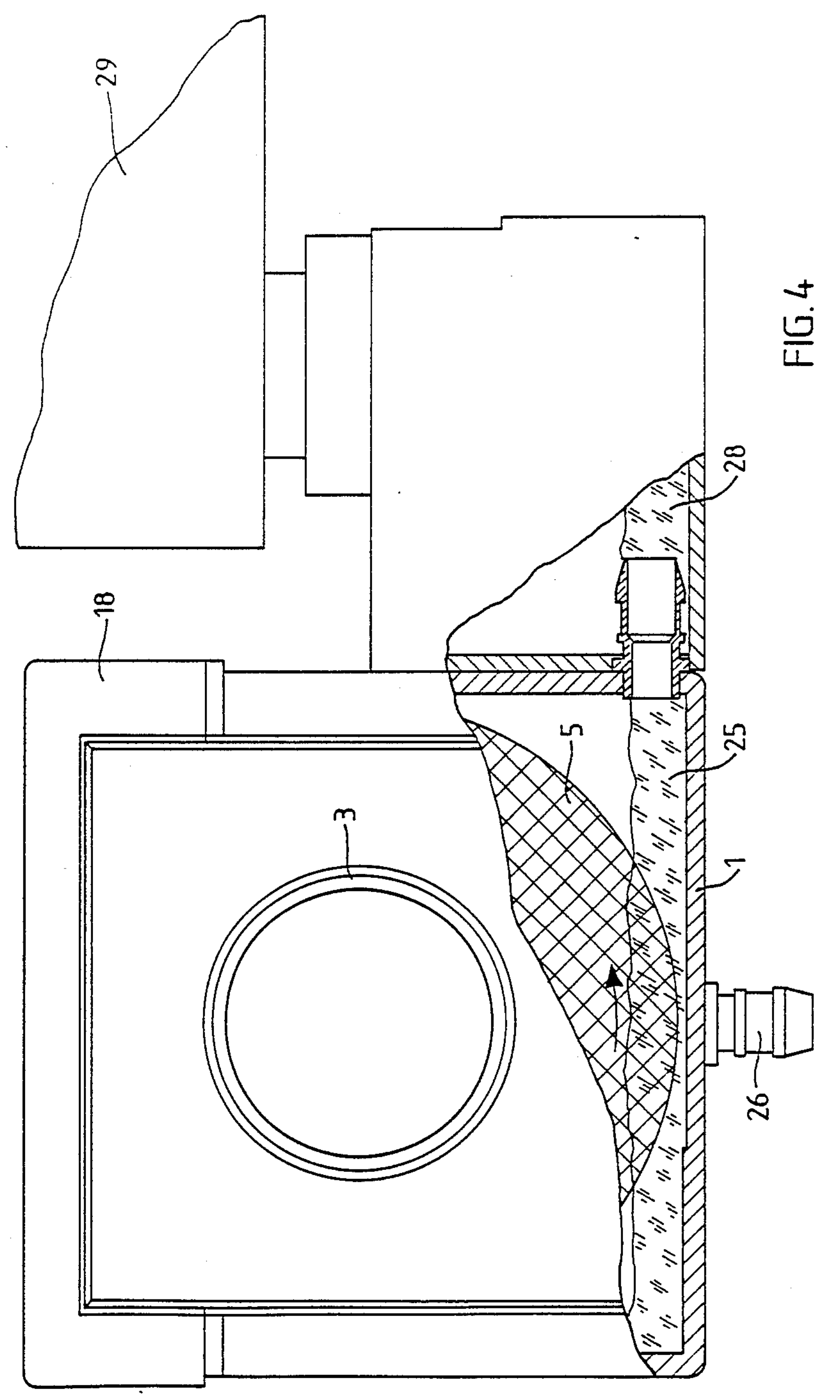
FIG. 4 is a partially broken view of the air humidifier of FIG. 3, on an enlarged scale.

When for some reasons one cannot or does not want to work with tap water, the bath 25 can be connected with a container 28 as shown in FIGS. 3 and 4. A bottle 26 with its outlet opening can be inserted downwardly into the container 28 similarly to a chicken drinking device. The liquid has the same level in the bath 25 and the container 28. When the water level is lower as a result of suction of the water by the foam material disc 5, water from the bottle 29 flows out. The water is sucked by the rotating foam material disc 5 so that with this solution a very uniform liquid distribution in the foam material disc 5 is produced. It is advantageous in the sense of uniform liquid distribution to provide the arrangement in accordance with FIG. 1 in which water flows from above onto the foam material disc 5 and trickles downwardly, and the rotation of the foam material disc 5 provides an extremely uniform liquid distribution in the foam material disc 5.

By the rotation of the foam material disc 5, as explained hereinabove, an extremely uniform moisturizing of the foam material disc is provided. Thereby with a small volume and small outer surface of the foam material disc 5 an optimal moisturizing of the air which is blown through it is achieved. As a result of this the outer side of the housing 1, 18 can be maintained very small. This is very important since the above described air humidifier must be used for moisturizing the inner chamber 6 of dry treatment device 32 for films and thereby occupy very little space, since the closure on the inner chamber 6 of the device 32 must be light-tight and this light-tightness must not be affected by the movable masses in the air humidifier.

For insuring the light-tightness of the closure between the air discharge opening 3 for the moisturized air and the inner chamber 6 of the device, the air discharge opening can be surrounded by a foam material edge 30 as shown in FIG. 1. It is pressed together with the device 32 by screwing. As shown in FIGS. 2 and 3 a small console 31 can be provided outside of the device. The air humidifier 1 can be placed on the console or screwed with it. Finally, it is also possible to arrange the air humidifier 1 in a free space in the interior of a developing machine 33 which are connected with the device 32. In this case the air humidifier can be provided with supply and discharge from the connections of the developing machine 33, and connected in a light-tight manner with the dry treatment aggregate 32. It is necessary in such case to connect a hose to the air aspirating side and to extend it from the device to an outside air.

It will be understood that each of the elements described above, or two or more together, may also find a useful application in other type of constructions differing from the types described above.

While the invention has been illustrated and described as embodied in an air humidifier for dry treatment device for photographic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An air humidifier for moisturizing air in a dry treatment device for a photographic material, comprising a housing having inner walls and provided with at least one air aspiration opening and at least one air discharge opening; a moisturizable element arranged in said housing; means for blowing air through said moisturizable element and then through said air discharge opening to a space to be moisturized and also located in said housing, said moisturizing element being formed as a rotatable disc arranged before said air discharge opening and provided with rotary drive means for its rotation; a light protective plate arranged between said moisturizable disc and said means for blowing air and at least locally spaced from said inner wall of said housing so as to form throughgoing air passages; and light separating parts provided behind said throughgoing air passages and before said moisturizable disc.

2. An air humidifier as defined in claim 1, wherein said rotary drive means includes a motor, said light protective plate being located between said moisturizable disc and said motor.

3. An air humidifier as defined in claim 1, wherein said rotary drive means includes a motor, said air blowing means including a ventilator and a motor for said ventilator, said light protecting plate being arranged between said motor of said rotary drive of said moisturizable disc and said motor for said ventilator of said air blowing means.

4. An air humidifier as defined in claim 1, wherein said moisturizable disc is formed as a foam material disc.

5. An air humidifier as defined in claim 1, wherein said light separating parts include a plurality of labyrinth ribs and grooves provided on said walls of said housing, and walls of a support for said moisturizable disc which are engageable with said labyrinth ribs and grooves.

6. An air humidifier as defined in claim 5, wherein said moisturizable disc is provided with a shaft, said support for said moisturizable disc being formed so as to support said shaft.

7. An air humidifier as defined in claim 5; and further comprising a removable cover which is connectable in a light-tight manner with said housing, said cover having at least one opening and at least one cover plate which carries said support for said moisturizable disc and is insertable in said opening.

8. An air humidifier as defined in claim 1; and further comprising a rear wall which is arranged at a distance from said housing and at a side which is opposite to said air discharge opening, said air aspiration opening is formed between said housing and said rear wall; and means for holding said rear wall at a distance from said housing.

9. An air humidifier as defined in claim 8, wherein said holding means includes grooves provided in said housing and pins provided in said rear wall and having heads which extend toward said air blowing means and are insertable in said grooves.

10. An air humidifier as defined in claim 1; and further comprising a bath arranged under said moisturizable disc.

11. An air humidifier as defined in claim 10, wherein said bath is arranged so that it collects a liquid which is dripping from said moisturizable disc.

12. An air humidifier as defined in claim 10, wherein said bath is arranged under said moisturizable disc so as to collect a liquid which is used for moisturizing said moisturizable disc.

13. An air humidifier as defined in claim 10, wherein said bath is arranged also under said rotary drive means for driving said moisturizable disc.

14. An air humidifier as defined in claim 10, wherein said air blowing means includes a ventilator, said bath being also arranged under said ventilator.

15. An air humidifier as defined in claim 1; and further comprising a liquid supply opening arranged to supply tap water above said moisturizable disc so as to moisturize said moisturizable disc from above; and a bath arranged under said moisturizable disc and provided with a discharge opening for tap water discharge from said moisturizable disc.

16. An air humidifier as defined in claim 15, wherein said supply opening for supplying tap water to said moisturizable disc is provided in said housing.

17. An air humidifier as defined in claim 15; and further comprising a removable cover which is connectable with said housing in a light-tight manner, said supply opening for supplying tap water to said moisturizable disc being provided in said cover.

18. An air humidifier as defined in claim 1; and further comprising a bath having an inner chamber to be filled with a liquid and arranged so that said moisturizable disc is immersed in the liquid during its rotation; and supply means for supplying said bath with liquid.

19. An air humidifier as defined in claim 18, wherein said supply means includes a supply container communicating with said bath and a supply bottle which can be inserted in said supply container to provide a constant liquid level in said bath.

20. An air humidifier as defined in claim 1; and further comprising means for light-tightly connecting said air discharge opening of said housing with an opening of a dry treatment device.

21. An air humidifier as defined in claim 1; and further comprising means for placing said housing in a free space of a wet treatment device connectable with a dry treatment device; and means for light-tightly connecting said air discharge opening of said housing with an opening of an intermediate wall between the dry treatment device and the wet treatment device.

* * * * *